(12) United States Patent
Dutta et al.

(10) Patent No.: US 6,988,073 B2
(45) Date of Patent: Jan. 17, 2006

(54) METHOD, SYSTEM, AND PRODUCT FOR FACILITATING INTERNATIONAL TRAVEL WITH RESPECT TO IMMIGRATION

(75) Inventors: Rabindranath Dutta, Austin, TX (US); Dwip N. Banerjee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 09/852,828

(22) Filed: May 10, 2001

(65) Prior Publication Data

US 2002/0169692 A1 Nov. 14, 2002

(51) Int. Cl.
*G06F 17/60* (2006.01)
(52) U.S. Cl. ......................................................... 705/1
(58) Field of Classification Search .................... 705/1; 709/217, 219
See application file for complete search history.

(56) References Cited

U.S. PATENT DOCUMENTS

| | | | | |
|---|---|---|---|---|
| 4,947,028 | A | | 8/1990 | Gorog .......................... 235/380 |
| 5,666,493 | A | | 9/1997 | Wojcik et al. ................. 705/26 |
| 5,799,151 | A | | 8/1998 | Hoffer .......................... 709/204 |
| 5,968,110 | A | | 10/1999 | Westrope et al. ............. 705/27 |
| 6,085,976 | A | * | 7/2000 | Sehr ............................ 235/384 |
| 6,366,925 | B1 | * | 4/2002 | Meltzer et al. ................. 705/6 |
| 6,460,020 | B1 | * | 10/2002 | Pool et al. ..................... 705/26 |
| 6,801,907 | B1 | * | 10/2004 | Zagami ........................ 707/3 |
| 6,842,741 | B1 | * | 1/2005 | Fujimura ..................... 705/59 |
| 2002/0109647 | A1 | * | 8/2002 | Crandall et al. ............. 345/2.1 |
| 2002/0147607 | A1 | * | 10/2002 | Thakur et al. ................. 705/1 |
| 2005/0031076 | A1 | * | 2/2005 | McClelland et al. .......... 378/57 |

FOREIGN PATENT DOCUMENTS

| | | |
|---|---|---|
| JP | 1132857 | 11/1999 |
| JP | 11328257 | 11/1999 |
| JP | 2000 242700 | 9/2000 |
| WO | WO 97/07468 | 2/1997 |
| WO | WO-9720289 A1 * | 6/1997 |
| WO | WO 97/35262 | 9/1997 |
| WO | WO 99/34272 | 7/1999 |
| WO | WO 00/29974 | 5/2000 |
| WO | WO 00/29995 | 5/2000 |
| WO | WO 00/52555 | 9/2000 |
| WO | WO 00/58883 | 10/2000 |

OTHER PUBLICATIONS

Vandyk, A., "No Entry," Air Transport World, vol. 29, No. 10, pp. 46-49, Oct. 1992.*
Anon., "Customs Service Means Customer Service," PR Newswire, Mar. 30, 1999.*

(Continued)

*Primary Examiner*—Nicholas D. Rosen
(74) *Attorney, Agent, or Firm*—John Biggers; Mark S. Walker; Biggers & Ohanian, LLP

(57) ABSTRACT

Method, system, and product for facilitating international travel, including creating, in response to a signal from an internet-enabled device coupled for data communications through an internet to an international travel server, a travel record to be stored within the international travel server; creating in dependence upon the travel record, an immigration admissions form for the destination country; and submitting the immigration admissions form to an immigration admission forms database for the destination country.

39 Claims, 3 Drawing Sheets

OTHER PUBLICATIONS

Anon., "Getting Accustomed to Service with a New, Faster Process, Airport Enforcement Agency Keeps Travelers Moving," Rocky Mountain News, Sunday Magazine/Travel, p. 1T, Jun. 6, 1993.*

McCarthy, S.P., "INS Tries a Hand-on Approach to IDs," Government Computer News, vol. 12, No. 13, p. 56, Jun. 21, 1993.*

O'Neill, K., "Speeding up Customs Clearance," Tour & Travel News, p. 20, Nov. 20, 1995.*

Anon., "U.S. Customs Service WWW Update: Trade & Travel Forms Free on Web Site," PR Newswire, Nov. 30, 1998.*

* cited by examiner

METHOD, SYSTEM, AND PRODUCT FOR FACILITATING INTERNATIONAL TRAVEL WITH RESPECT TO IMMIGRATION

BACKGROUND OF THE INVENTION

1. Field of the Invention

The field of the invention is methods and systems facilitating international travel, and more particularly, methods and systems for facilitation of facilitation of immigration planning and admissions.

2. Description of Related Art

With advances in technology, the world is becoming a smaller place. The number of international travelers has grown phenomenally in the recent past. Crossing borders, however, entails adherence to different sets of rules and regulations for different nations. Every international traveler has to pass through immigration checks and these checks are some of the most irritating and time-consuming aspects of international travel. The emergence of new technologies in the form of wired or wireless data communications has offered new opportunities for improved user experiences while complying with immigration regulations.

Moreover, in modern relations among nations, there is a trend toward travel without visas. Under one present international visa waiver program, for example, travelers can move among twenty-nine nations without visas. The nations participating in this program are: Andorra, Argentina, Austria, Australia, Belgium, Brunei, Denmark, Finland, France, Germany, Iceland, Ireland, Italy, Japan, Liechtenstein, Luxembourg, Monaco, the Netherlands, New Zealand, Norway, Portugal, San Marino, Singapore, Slovenia, Spain, Sweden, Switzerland, The United Kingdom, and Uruguay. Despite the ease of such visa-less travel, however, it is very difficult for travelers to know with certainty that they will actually be admitted to a destination nation. Visas, after all, are not grants of admission. Visas are authorization to apply for admission to the nation that granted the visa. By agreeing to permit travel without visas, the nations participating in the visa waiver program have agreed to allow travelers who are citizens of other participating nations travel to a port of entry and apply for admission without a prior need for a visa.

Such travelers can still be excluded for many reasons, some of which are very difficult to analyze in advance. In the U.S., for example, travelers applying for admission under the waiver program can be refused admission to the U.S. at the port of entry and returned immediately on the same carrier that brought them to the port of entry for any of a variety of reasons having to do with communicable diseases having public health significance, physical or mental disorders that may pose a threat to the safety of the traveler or others, crimes involving controlled substances, crimes involving moral turpitude, multiple criminal convictions, particularly severe violations of religious freedom, and being the spouse or child of an illicit trafficker in a controlled substance or listed chemical.

The application of such rules and regulations, moreover, varies considerably from nation to nation. It is very difficult, given present information availability and systems quality, to know with certainty in advance of arriving in a port of entry, for example, whether one will be excluded for what one believes to be honest, non-criminal political offenses. It is very difficult, given present information availability and systems quality, to know with certainty in advance of arriving in a port of entry, for example, whether one will be excluded for what one believes to be a well-controlled, although somewhat serious disease. Travelers can easily find their travel plans frustrated or ruined. The presence in systems of international travel of persons particularly at risk of encountering delays, persons who might not have traveled if they had had better information, unduly burdens systems of international travel and damages the experience of international travel for all travelers.

For all these reasons, therefore, there is an ongoing need for improvements in methods and systems for, and the experience of, international travel.

SUMMARY OF THE INVENTION

A first aspect of the invention includes methods for facilitating international travel including creating, in response to signals communicated through an internet-enabled device coupled for data communications through an internet to an international travel server, a travel record to be stored within the international travel server. Typical embodiments include also creating in dependence upon the travel record, an immigration admissions form for the destination country and submitting the immigration admissions form to an immigration admission forms database for the destination country. In typical embodiments, travel records comprise travel record forms, and the travel records forms are dependent upon admissions rules.

Embodiments of internet-enabled devices include workstations in kiosks at airports, workstations installed in the back of passenger chairs in airplanes, personal computer, and hand-held personal data administrator. Internet-enabled devices are connected to international travel servers through means for data communications including wireless internet connections.

In typical embodiments, travel records comprises travel data describing travel, the travel data including identification of a traveler and of a destination country. In typical embodiments, the international travel server is a software application installed and operating on one or more computers, the software application further comprising software routines storing and retrieving travel records, validating travel described in travel records against admissions rules stored in admissions rules databases, and submitting to immigration databases immigration admissions forms prepared in dependence upon the travel records. Typical embodiments of the invention include creating in dependence upon travel records, immigration admissions forms for destination countries, which includes also reading travel data from a travel record and inserting the read travel data into an immigration admissions form.

Typical embodiments include validating travel described in travel records. Validating travel includes comparing the travel described by travel data in the travel record to admissions rules governing the travel described by the travel data in the travel record and reporting to the traveler through the internet-enabled device a result of the comparison.

The foregoing and other objects, features and advantages of the invention will be apparent from the following more particular description of exemplary embodiments of the invention, as illustrated in the accompanying drawings wherein like reference numbers represent like parts of the invention.

DETAILED DESCRIPTION OF EXEMPLARY EMBODIMENTS

The present invention is described primarily in terms of methods for facilitating international travel. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units coupled to computer memory, which systems have the capability of storing in computer memory programmed steps of the method of the invention for execution by a processing unit. The invention also may be embodied in a computer program product, such as a diskette, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product.

Figure 1:
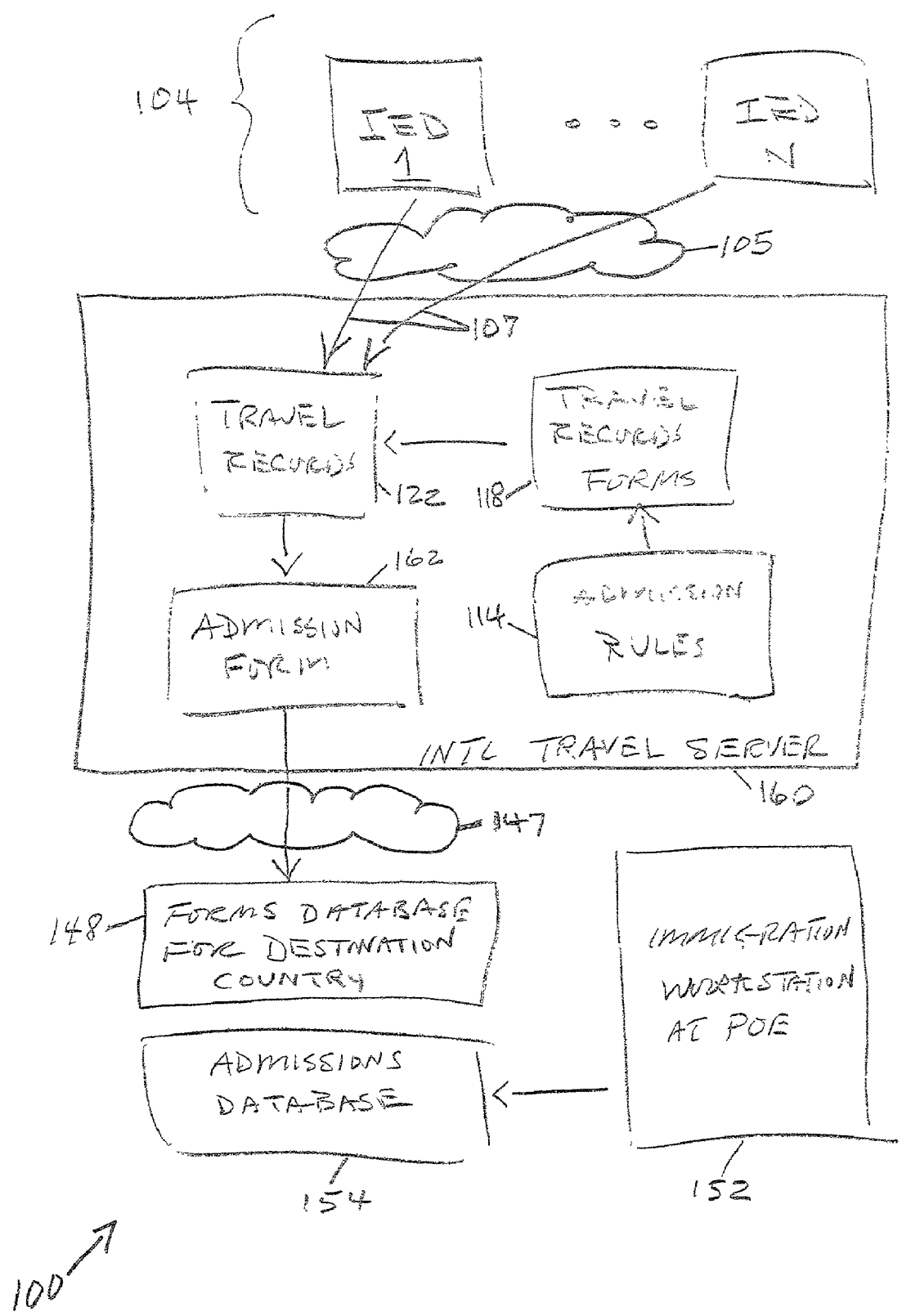
FIG. 1 is a block diagram of an embodiment of the invention.

Turning now to FIG. 1, a first aspect of the invention is seen embodied as a system (100) for facilitating international travel. The illustrated embodiment includes means for creating (160), in response to signals (107) communicated through internet-enabled devices (104) travel records (122) to be stored within an international travel server (160). The internet-enabled devices in typical embodiments, as in the embodiment shown in FIG. 1, are coupled for data communications through an internet (105) to the international travel server (160). The international travel server is means for creating travel records in that the server is a collection of computer programs installed and operating upon one or more computers including computer processors and computer memory. In the illustrated embodiment, the international travel server itself comprises travel records (122), travel record forms (118), admissions rules (114), and admissions forms (162).

In the embodiment of FIG. 1, the admissions rules are immigration rules and regulations for admission to destination countries organized by country. The travel record forms are data structures containing set of data elements identifying information pertinent to immigration admissions to the destination countries. The travel record forms are defined in dependence upon the admissions rules.

In the illustrated embodiment, the travel records are data structures that identify and describe a particular trip, an event of international travel upon one occasion for a traveler. The structure of the travel records, the data elements within them are derived from the travel record forms. In the illustrated embodiment, the admissions forms (162) are official immigrations admissions forms prepared on-line within the international travel server using information entered by a traveler into a travel record.

The system embodiment as shown in FIG. 1 is capable of preparing admissions forms (162) on-line and forwarding them electronically to an immigrations database (148) in a destination country. In typical embodiments, the electronic forwarding is accomplished via an internet (147). Admissions forms in a destination country's admissions forms database are available for use by customs personnel through immigration workstations (152). Upon a traveler's admission to a destination country, in typical embodiments, an immigration workstation is capable of forwarding a completed and approved electronic admissions form to a central admissions database (154), such as the one known in the U.S. and NIIS, the National Immigration Information System.

In accordance with the illustrated embodiment, the internet-enabled devices (104) can be wireless devices or they can be coupled electronically to the international travel server. The internet-enabled devices in various embodiments of the invention are workstations in kiosks at airports, workstations installed in the backs of passenger chairs in airplanes, personal computers, and hand-held personal data administrators. Persons skilled in art will realize that any device capable of functioning as a terminal to a computer application software, any device capable of supporting an internet connection, or any device capable of supporting a client in a client-server environment is useful as an internet-enabled device within the scope of the present invention. In fact, there are many different kinds of such devices and all of them useful as described are well within the scope of the invention.

Figure 2:
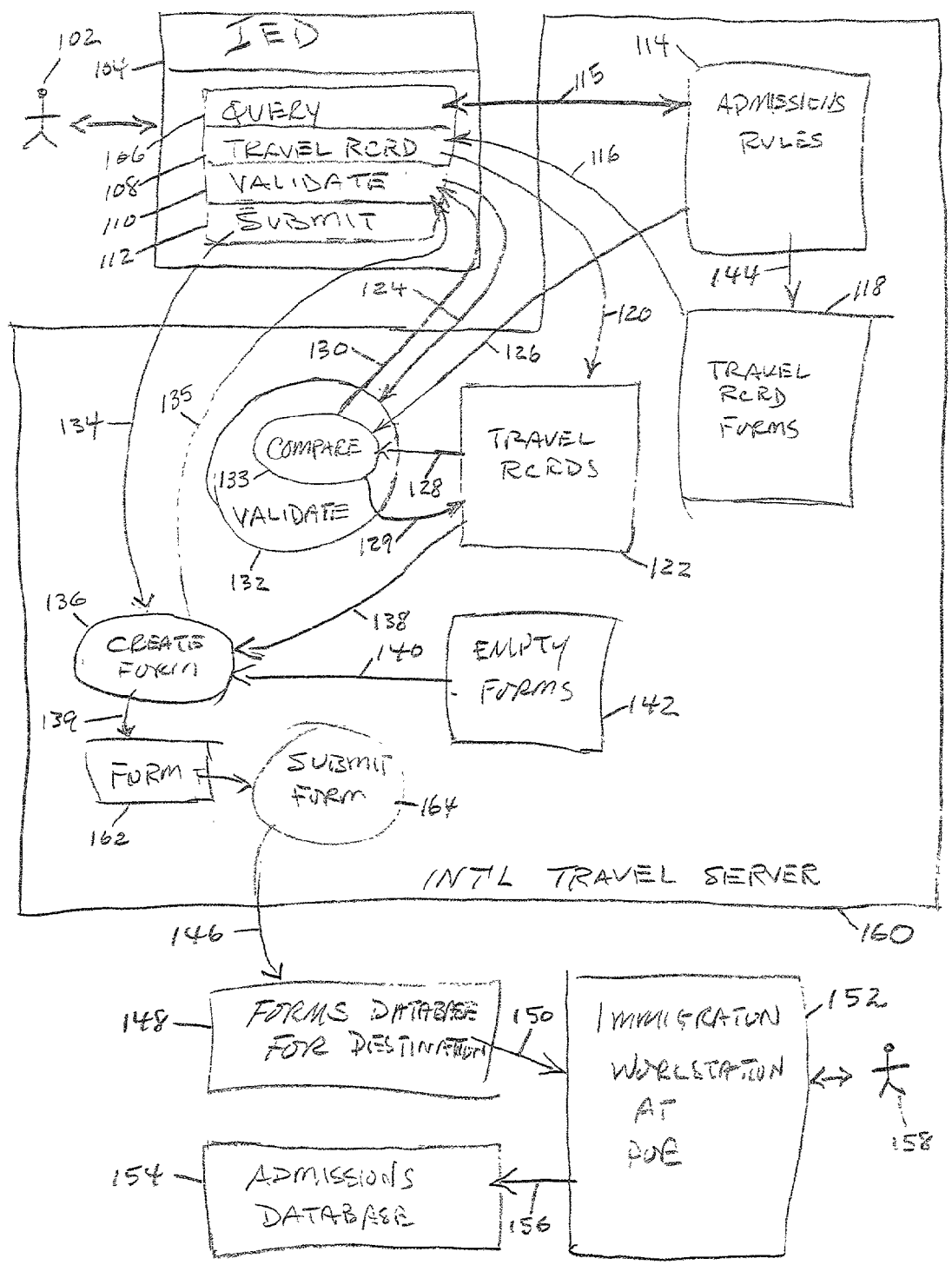
FIG. 2 is a process flow diagram of various exemplary aspects and embodiments of the invention.

Turning now to FIG. 2, a further first aspect of the invention is seen as methods for facilitating international travel. A first embodiment illustrated in FIG. 2 includes creating, in response to a signal (120) communicated through an internet-enabled device coupled for data communications via an internet to an international travel server, a travel record to be stored within the international travel server. The illustrated embodiment includes also creating in dependence upon the travel record, an immigration admissions form for the destination country. The illustrated embodiment further includes submitting the immigration admissions form to an immigration admission forms database for the destination country.

In typical embodiments, travel records (122) comprise travel record forms (118), wherein the travel record forms (118) are dependent upon admissions rules. More specifically, in order for the travel data in the travel records to be used, as it eventually is intended in typical embodiments, for creating immigration admissions forms, the travel records must record data pertinent to the immigration admission form of the destination country for a particular traveler.

For example, a business traveler who is a citizen of the United Kingdom traveling to the U.S. on a brief business trip will eventually wish to create and submit as an immigration admission form a U.S. Form I-94W. The conclusion that the pertinent form is an I-94W depends upon admissions rules for the U.S. stored in an admissions rules database as part of an international travel server. The travel record created for this example British citizen for a business trip to the U.S. will typically therefore be formulated to include the data needed to create a Form I-94W.

This is the sense in which, in typical embodiments, travel records (122) comprise travel record forms (118), wherein the travel record forms (118) are dependent upon admissions rules. And as shown in FIG. 2, in embodiments of the kind illustrated, if the example British citizen is taken as the traveler (102), then when the traveler (102) requests (108) a travel record, the international travel server retrieves from among the travel record forms (118) a travel record form having data elements appropriate to a citizen of the United Kingdom traveling on business to the U.S., and provides a copy of the travel record form, which, after the traveler provides the information comprising the form, is stored (120) as a travel record (122).

Persons of skill in the art will recognize immediately that internet-enabled devices include workstations in kiosks in airports as well as workstations installed in the back of a passenger chairs in airplanes. Typical embodiments of the invention utilize as internet-enabled devices personal computers and hand-held personal data administrators.

In the embodiment illustrated, all of the communications between the internet-enabled device (104) and the international travel server (160), including for example the communications indicated by reference numbers (115), (116), (120), (124), (130), (134), and (135), are implemented through internet connections. In some embodiments the internet connections are wireless. In some embodiments internet connections are implemented through wired connections. As internet connections are one kind of network connection, other embodiments implement data communications between the internet-enabled device and the international travel server by use of intranets, internets, direct dial-up connections, or dedicated lines. Any means of data communication between the internet-enabled device and the international travel server are well within the scope of the present invention.

Moreover, it is useful to note that the internet-enable device in some embodiments is not internet-enabled. Because internet-enablement is so typical among embodiments of the present invention, for convenience, this specification refers to the device used by a traveler to communicate with the international travel server as an internet-enabled device. In fact, any device capable of implementing a data communications connection of any kind and communicating commands or requests and receiving responses to and from the international travel server is well within the scope of the present invention.

In typical embodiments of the kind illustrated in FIG. 2, travel records (122) comprise travel data describing travel, the travel data including identification of travelers and identification of destination countries. In embodiments of the kind illustrated, the international travel server (160) is a software application installed and operating on one or more computers, the software application further comprising software routines for storing (120) and retrieving (1288, 138) travel records, validating (132) travel described in travel records against admissions rules stored in admissions rules databases (114), and submitting (164) to immigration databases (148) immigration admissions forms (162) prepared in dependence upon (138) the travel records (122).

Embodiments of the kind illustrated typically include creating (136) in dependence upon travel records (122), immigration admissions forms 136) for destination countries, as well as reading travel data (138) from a travel record (122) and inserting (139) the read travel data into an immigration admissions form (162). Embodiments of the kind illustrated typically include submitting (164) the immigration admissions form (162) to an immigration admission forms database (148) for the destination country. In typical embodiments, submitting the immigration admissions forms includes communicating the forms as electronic data communications through at least data communications connection. In typical embodiments, the data communications connection is an internet connection.

Embodiments of the kind illustrated typically include a capability of validating (132) the travel described in a travel record (122). In typical embodiments, validating travel described in a travel record includes comparing (133) the travel described by travel data in the travel record (122) to admissions rules (114) governing the travel described by the travel data in the travel record and reporting (130) to the traveler (102) through the internet-enabled device (104) a result of the comparison. In some embodiments, validating includes storing (129) the result of the comparison in the travel record.

Figure 3:
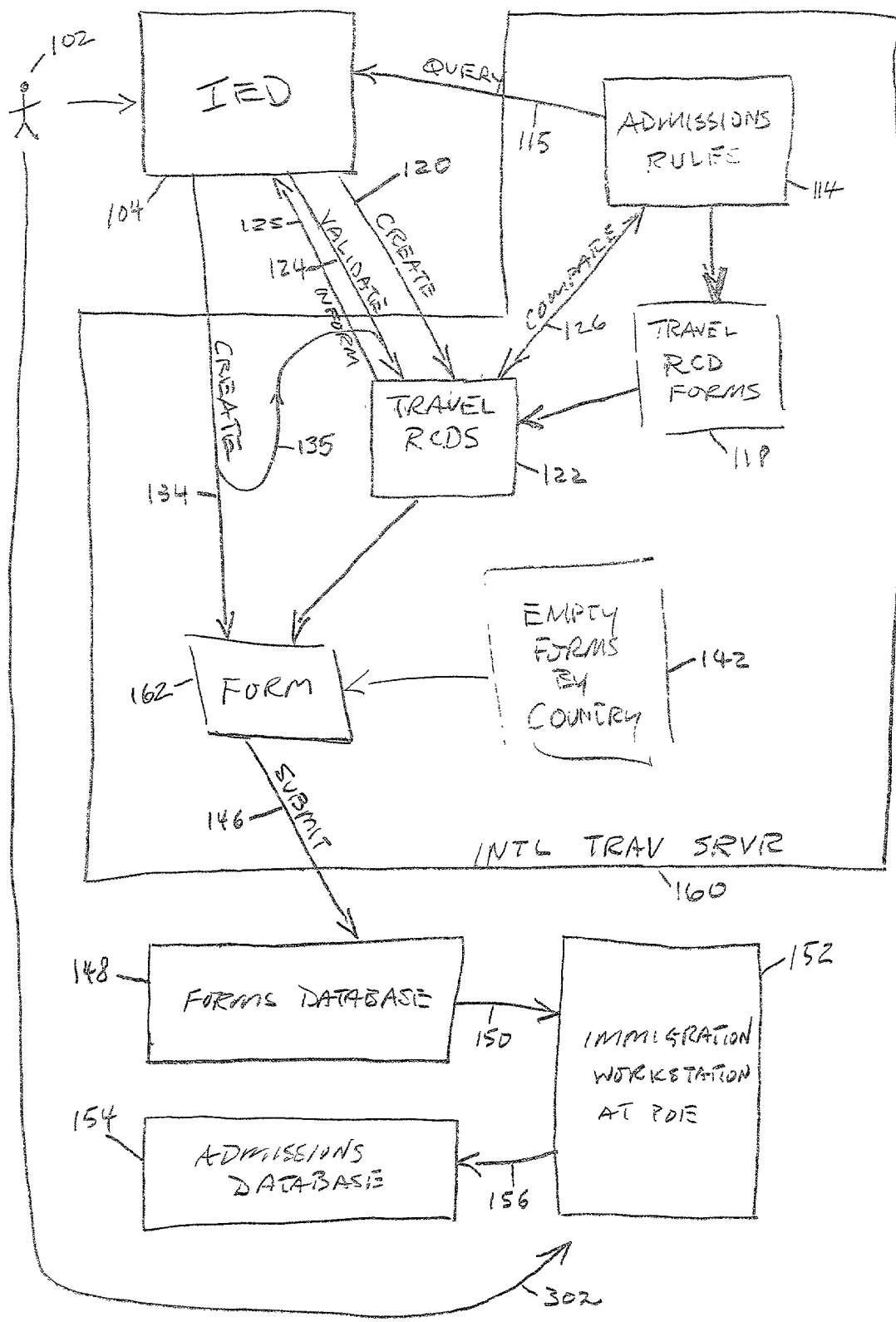
FIG. 3 is a process flow diagram of an embodiment illustrating a use case.
Figure 1:
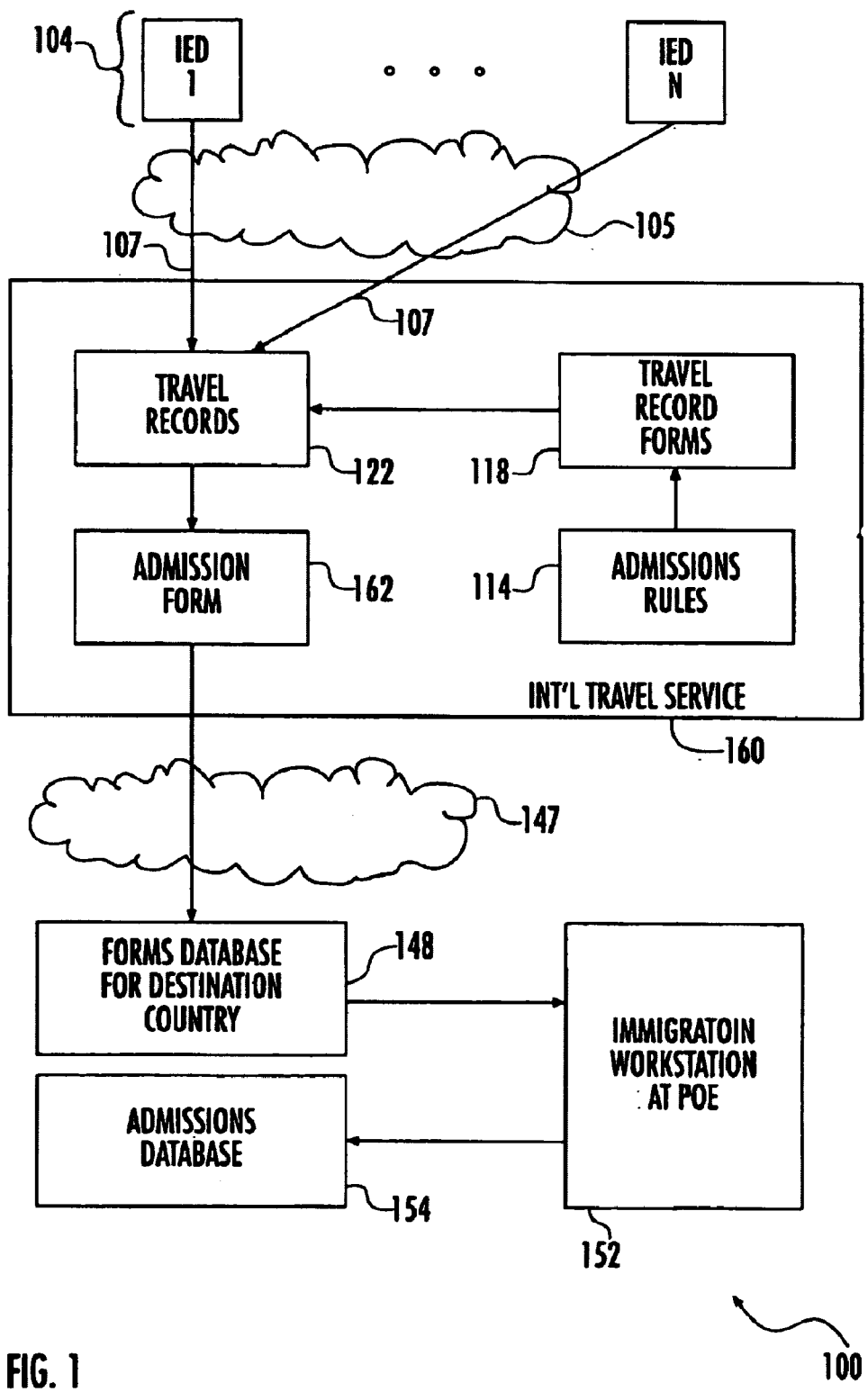
Figure 2:
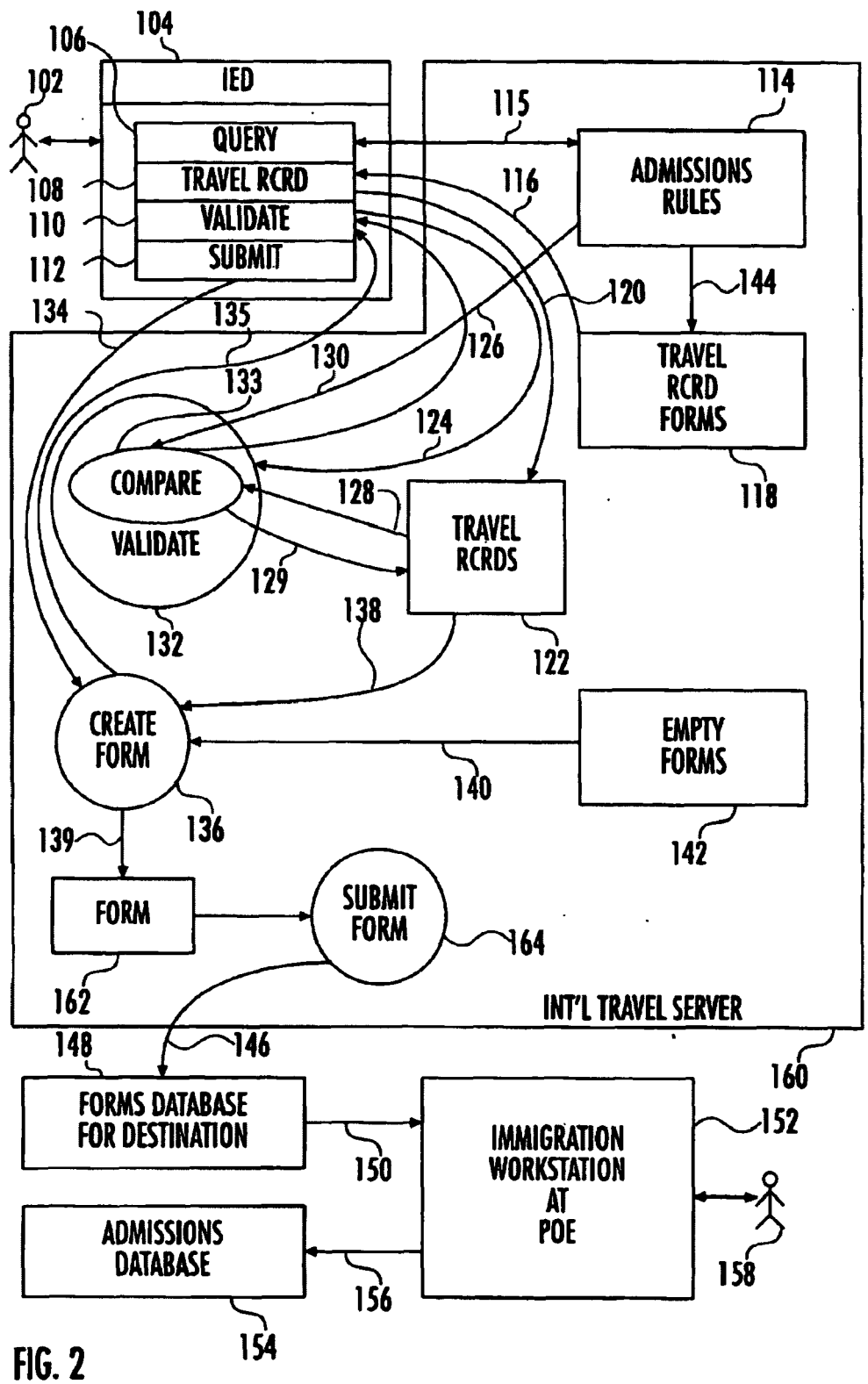
Figure 3:
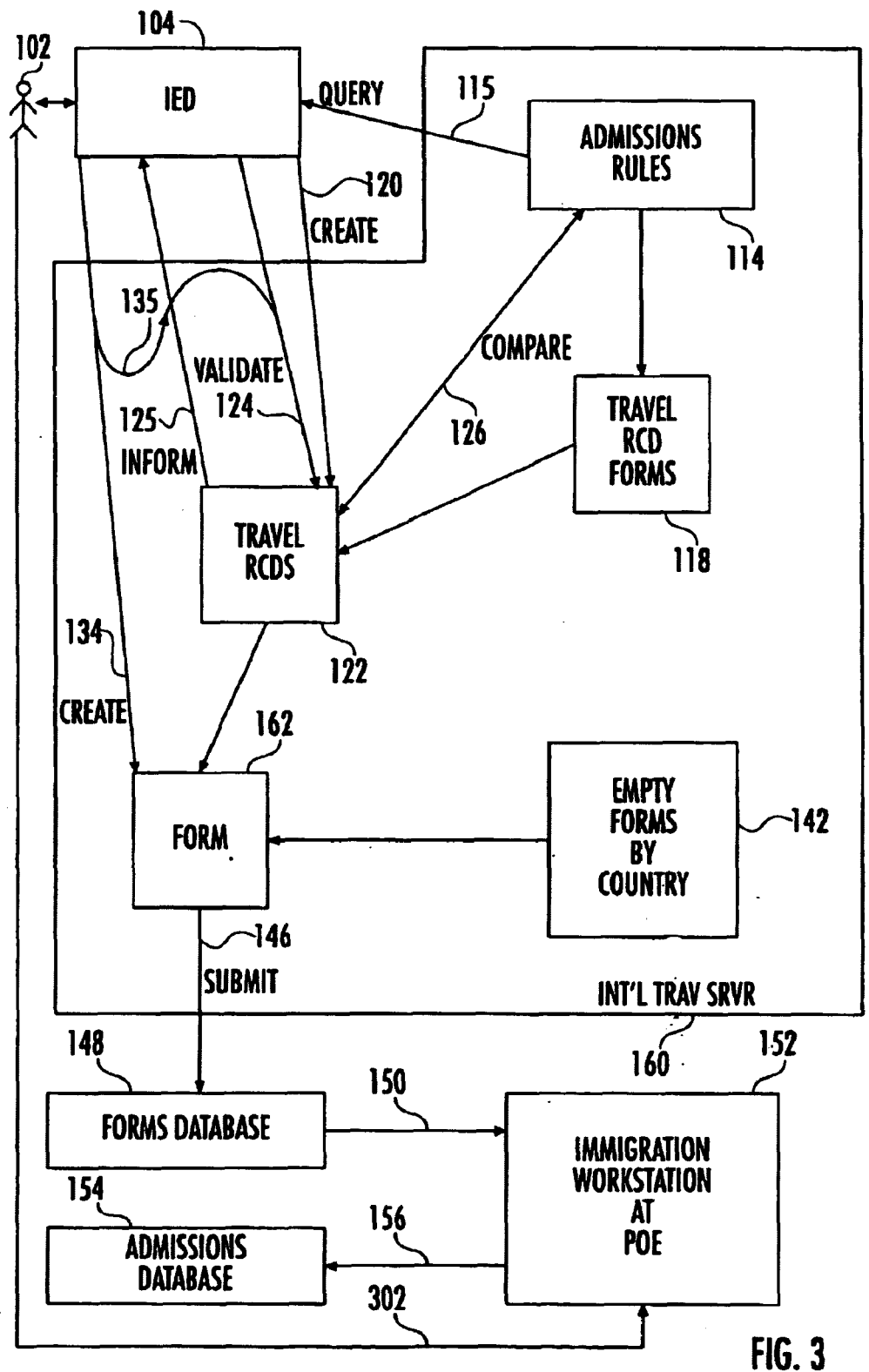

Turning now to FIG. 3, a further aspect of the invention is illustrated in terms of a use case. In an embodiment as shown in FIG. 3, a traveler (102) uses an internet-enabled device (104) to query (115) an admissions rules database (114) in an international travel server (160). The query (115) advises the user of the immigration admissions rules and regulations for a destination country. If, for example, the user were a citizen of the United Kingdom asserting a query regarding rules for admission to the United States, the query advises the traveler that no visa is required but that the traveler must submit a Form I-94W. In typical embodiments, the query advises the traveler also of additional rules of admission such as limitations regarding health or criminal convictions. Alternatively to beginning with a query, the traveler proceeds directly to preparation of a travel record.

In the use case of the embodiment as illustrated in FIG. 3, the traveler (102) signals the international travel server to create (120) a travel record (122) within the international travel server (160). In typical usage, the traveler decides based upon the query (115) that the traveler reasonably can expect to be admitted to the traveler's destination country. The traveler then signals creation of (120) a travel record (122) describing a trip, a particular instance of travel, under consideration, describing the trip with information identifying the traveler, the destination, the traveler's health information, the traveler's criminal background, and whatever other information is needed to support immigration admissions in the destination country. The travel record (122) contains data elements needed to support immigration admissions in the destination country because the travel record contains data elements derived from a travel record form (118) that is fashioned in dependence upon the admissions rules (114) for the destination country.

After creating a travel record describing the travel under consideration, in typical usage of the embodiment illustrated in FIG. 3, the traveler validates (124) the travel described in the travel record for likelihood of admission to the destination country. The international travel server validates the travel described in the travel record by comparing (126) the information in the travel record with the information in the admissions rules regarding admissions to the destination country. Validating includes informing (125) the traveler through the internet-enabled device whether the information provided by the traveler in the travel record, as compared with the admissions rules for the destination country, indicates any potential difficulties regarding the traveler's admission into the destination country.

Having queried the admissions rules (115), created a travel record (120), and validated (124) the travel described in the travel record, the traveler in typical usage has confidence that the traveler upon arrival will be admitted into the destination country. Alternatively, the traveler decides based merely upon the query that the traveler is reasonably likely to be admitted to the destination country and therefore proceeds to create and submit an admissions form without validating the travel record. Either way, if the traveler decides to proceed with the trip in question, the traveler in typical usage orders through the internet-enabled device the creation (134) and submission (146) to a admissions forms database (148) in the destination country or port of entry an official on-line admissions form (162) for the destination country.

When the traveler arrives (302) in the immigration area at the port of entry in the destination country, the admissions form (162) is available to immigration personnel on immigration workstations (152). When the traveler is admitted to the destination country, usage of the illustrated embodiment includes available printing of a paper copy for the traveler to carry with the traveler's passport and available electronic embodiment of the admissions form for filing in the electronic arrival/departure records of the destination country.

In cases where the traveler is confident of admission to a destination country, as when for example the traveler has recently traveled to destination country and knows for certain that the traveler is unlikely to be denied admission, then the traveler typically does not effect a query (115) or a validation (124). In such cases, the traveler proceeds directly to creation (120) of a travel record (122) and creation and submission of an admissions form. In some embodiments of the invention, creating (134) a travel form automatically triggers (135) validation, so that travelers can always be assured of being informed of risks, if any, of being denied admission to the destination country.

In typical usage of embodiments of the inventions there is no need for the traveler to touch a piece of paper, although the traveler naturally optionally prints a copy of the admissions form if the traveler wishes to do so. In usage of typical embodiments, there is no need for a traveler to wait until the traveler is on an airplane nearly at a port of entry in the destination country before filling out an admissions form. In usage of typical embodiments, there is no need for a traveler to wait until the traveler is on ground in the port of entry of the destination country to discover the traveler's relative likelihood of admission or whether there might be some factor in the admissions rules of the destination country that would increase the traveler's risk of being denied admission to the destination country.

It will be understood from the foregoing description that various modifications and changes may be made in the various embodiment of the present invention without departing from its true spirit. It is intended that this description of exemplary embodiments is for purposes of illustration only and should not be construed in a limiting sense. The scope of this invention should be limited only by the language of the following claims.

What is claimed is:

1. A method for facilitating international travel, the method comprising the steps of:
    creating, in response to a signal communicated through an internet-enabled device coupled for data communications through at least one internet connection to an international travel server, a travel record to be stored within the international travel server;
    creating, in dependence upon the travel record, an immigration admissions form for a destination country;
    validating, by the international travel server separately from any immigration computer of the destination country, travel described in the travel record against admissions rules stored in an admissions rules database; and
    submitting the immigration admissions form to an immigration admission forms database for the destination country.

2. The method of claim 1 wherein the internet-enabled device is a workstation in a kiosk at an airport.

3. The method of claim 1 wherein the internet-enabled device is a workstation installed in the back of a passenger chair in an airplane.

4. The method of claim 1 wherein the internet-enabled device is a personal computer.

5. The method of claim 1 wherein the internet-enabled device is a hand-held personal data administrator.

6. The method of claim 1 wherein the at least one internet connection is wireless.

7. The method of claim 1 wherein the travel record comprises travel data describing travel, the travel data including identification of a traveler and of a destination country.

8. The method of claim 1 wherein the international travel server is a software application installed and operating on one or more computers, the software application further comprising software routines storing and retrieving travel records, validating travel described in travel records against admissions rules stored in admissions rules databases, and submitting to immigration databases immigration admissions forms prepared in dependence upon the travel records.

9. The method of claim 1 wherein creating in dependence upon the travel record, an immigration admissions form for the destination country, further comprises reading travel data from a travel record and inserting the read travel data into an immigration admissions form.

10. The method of claim 1 wherein submitting the immigration admissions form to an immigration admission forms database for the destination country further comprises communicating the forms as electronic data communications through at least one internet connection.

11. The method of claim 1 wherein validating the travel records further comprises comparing the travel described by travel data in the travel record to admissions rules governing the travel described by the travel data in the travel record and reporting to the traveler through the internet-enabled device a result of the comparison.

12. The method of claim 11 further comprising storing the result of the comparison in the travel record.

13. The method of claim 1 wherein the travel record comprises a travel record form, wherein the travel record form is dependent upon admissions rules.

14. A system for facilitating international travel, the system comprising:
    means for creating, in response to a signal communicated through an internet-enabled device coupled for data communications through at least one internet connection to an international travel server, a travel record to be stored within the international travel server;
    means for creating in dependence upon the travel record, an immigration admissions form for destination country;
    means for validating, by the international travel server separately from any immigration computer of the destination country, travel described in the travel record against admissions rules stored in an admissions rules database; and
    means for submitting the immigration admissions form to an immigration admission forms database for a destination country.

15. The system of claim 14 wherein the internet-enabled device is a workstation in a kiosk at an airport.

16. The system of claim 14 wherein the internet-enabled device is a workstation installed in the back of a passenger chair in an airplane.

17. The system of claim 14 wherein the internet-enabled device is a personal computer.

18. The system of claim 14 wherein the internet-enabled device is a hand-held personal data administrator.

19. The system of claim 14 wherein the at least one internet connection is wireless.

20. The system of claim 14 wherein the travel record comprises travel data describing travel, the travel data including identification of a traveler and of a destination country.

21. The system of claim 14 wherein the international travel server is a software application installed and operating on one or more computers, the software application further comprising software routines storing and retrieving travel records, validating travel described in travel records against admissions rules stored in admissions rules databases, and submitting to immigration databases immigration admissions forms prepared in dependence upon the travel records.

22. The system of claim 14 wherein means for creating in dependence upon the travel record an immigration admissions form for the destination country, further comprises means for reading travel data from a travel record and means for inserting the read travel data into an immigration admissions form.

23. The system of claim 14 wherein means for submitting the immigration admissions form to an immigration admission forms database for the destination country further comprises means for communicating the forms as electronic data communications through at least one internet connection.

24. The system of claim 14 wherein means for validating the travel records further comprises means for comparing the travel described by travel data in the travel record to admissions rules governing the travel described by the travel data in the travel record and means for reporting to the traveler through the internet-enabled device a result of the comparison.

25. The system of claim 24 further comprising means for storing the result of the comparison in the travel record.

26. The system of claim 14 wherein the travel record comprises a travel record form, wherein the travel record form is dependent upon admissions rules.

27. A computer program product embodied on a computer-readable medium, the computer program product comprising computer-implementable instructions for causing a computer to carry out the steps of:
creating, in response to a signal communicated through an internet-enabled device coupled for data communications through at least one internet connection to an international travel server, a travel record to be stored within the international travel server;
creating in dependence upon the travel record, an immigration admissions form for a destination country;
validating, by the international travel server separately from any immigration computer of the destination country, travel described in the travel record against admissions rules stored in an admissions rules database; and
submitting the immigration admissions form to an immigration admission forms database for the destination country.

28. The product of claim 27 wherein the internet-enabled device is a workstation in a kiosk at an airport.

29. The product of claim 27 wherein the internet-enabled device is a workstation installed in the back of a passenger chair in an airplane.

30. The product of claim 27 wherein the internet-enabled device is a personal computer.

31. The product of claim 27 wherein the internet-enabled device is a hand-held personal data administrator.

32. The product of claim 27 wherein the at least one internet connection is wireless.

33. The product of claim 27 wherein the travel record comprises travel data describing travel, the travel data including identification of a traveler and of a destination country.

34. The product of claim 27 wherein the international travel server is a software application installed and operating on one or more computers, the software application further comprising software routines storing and retrieving travel records, validating travel described in travel records against admissions rules stored in admissions rules databases, and submitting to immigration databases immigration admissions forms prepared in dependence upon the travel records.

35. The product of claim 27 wherein creating in dependence upon the travel record, an immigration admissions form for the destination country, further comprises reading travel data from a travel record and inserting the read travel data into an immigration admissions form.

36. The product of claim 27 wherein submitting the immigration admissions form to an immigration admission forms database for the destination country further comprises communicating the forms as electronic data communications through at least one internet connection.

37. The product of claim 27 wherein validating the travel records further comprises comparing the travel described by travel data in the travel record to admissions rules governing the travel described by the travel data in the travel record and reporting to the traveler through the internet-enabled device a result of the comparison.

38. The product of claim 37 further comprising storing the result of the comparison in the travel record.

39. The product of claim 27 wherein the travel record comprises a travel record form, wherein the travel record form is dependent upon admissions rules.

* * * * *

UNITED STATES PATENT AND TRADEMARK OFFICE
CERTIFICATE OF CORRECTION

PATENT NO. : 6,988,073 B2
APPLICATION NO. : 09/852828
DATED : January 17, 2006
INVENTOR(S) : Dulla et al.

It is certified that error appears in the above-identified patent and that said Letters Patent is hereby corrected as shown below:

Delete Title page illustrating figure, and substitute therefor, new Title page illustrating figure. (attached)

Delete drawing sheets 1-3, and substitute therefor, drawing sheets 1-3, with the attached sheets.

Signed and Sealed this

Seventeenth Day of October, 2006

JON W. DUDAS
*Director of the United States Patent and Trademark Office*

(12) United States Patent
Dutta et al.

(10) Patent No.: US 6,988,073 B2
(45) Date of Patent: Jan. 17, 2006

(54) METHOD, SYSTEM, AND PRODUCT FOR FACILITATING INTERNATIONAL TRAVEL WITH RESPECT TO IMMIGRATION

(75) Inventors: Rabindranath Dutta, Austin, TX (US); Dwip N. Banerjee, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 812 days.

(21) Appl. No.: 09/852,828

(22) Filed: May 10, 2001

(65) Prior Publication Data
US 2002/0169692 A1 Nov. 14, 2002

(51) Int. Cl.
*G06F 17/60* (2006.01)
(52) U.S. Cl. ............................................. 705/1
(58) Field of Classification Search ............ 705/1; 709/217, 219
See application file for complete search history.

(56) References Cited

U.S. PATENT DOCUMENTS

| | | | |
|---|---|---|---|
| 4,947,028 A | 8/1990 | Gorog | 235/380 |
| 5,666,493 A | 9/1997 | Wojcik et al. | 705/26 |
| 5,799,151 A | 8/1998 | Hoffer | 709/204 |
| 5,968,110 A | 10/1999 | Westrope et al. | 705/27 |
| 6,085,976 A * | 7/2000 | Sehr | 235/384 |
| 6,366,925 B1 * | 4/2002 | Meltzer et al. | 705/6 |
| 6,460,020 B1 * | 10/2002 | Pool et al. | 705/26 |
| 6,801,907 B1 * | 10/2004 | Zagami | 707/3 |
| 6,842,741 B1 * | 1/2005 | Fujimura | 705/59 |
| 2002/0109647 A1 * | 8/2002 | Crandall et al. | 345/2.1 |
| 2002/0147607 A1 * | 10/2002 | Thakur et al. | 705/1 |
| 2005/0031076 A1 * | 2/2005 | McClelland et al. | 378/57 |

FOREIGN PATENT DOCUMENTS

| | | |
|---|---|---|
| JP | 1132857 | 11/1999 |
| JP | 11328257 | 11/1999 |
| JP | 2000 242700 | 9/2000 |
| WO | WO 97/07468 | 2/1997 |
| WO | WO-9720289 A1 * | 6/1997 |
| WO | WO 97/35262 | 9/1997 |
| WO | WO 99/34272 | 7/1999 |
| WO | WO 00/29974 | 5/2000 |
| WO | WO 00/29995 | 5/2000 |
| WO | WO 00/52555 | 9/2000 |
| WO | WO 00/58883 | 10/2000 |

OTHER PUBLICATIONS

Vandyk, A., "No Entry," Air Transport World, vol. 29, No. 10, pp. 46-49, Oct. 1992.*
Anon., "Customs Service Means Customer Service," PR Newswire, Mar. 30, 1999.*

(Continued)

*Primary Examiner*—Nicholas D. Rosen
(74) *Attorney, Agent, or Firm*—John Biggers; Mark S. Walker; Biggers & Ohanian, LLP

(57) ABSTRACT

Method, system, and product for facilitating international travel, including creating, in response to a signal from an internet-enabled device coupled for data communications through an internet to an international travel server, a travel record to be stored within the international travel server; creating in dependence upon the travel record, an immigration admissions form for the destination country; and submitting the immigration admissions form to an immigration admission forms database for the destination country.

39 Claims, 3 Drawing Sheets

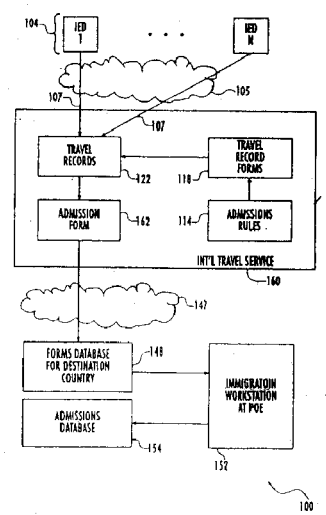

Disclaimer

6,988,073 — Rabindranath Dutta, Austin, TX (US); and Dwip N. Banerjee, Austin, TX (US). METHOD, SYSTEM AND PRODUCT FOR FACILITATING INTERNATIONAL TRAVEL WITH RESPECT TO IMMIGRATION. Patent dated January 17, 2006. Disclaimer filed October 06, 2006, by the assignee, International Business Machines Corporation.

Hereby disclaims all of the claims of said patent.

*(Official Gazette November 25, 2008)*